US011027902B2

(12) United States Patent
Geiger et al.

(10) Patent No.: US 11,027,902 B2
(45) Date of Patent: Jun. 8, 2021

(54) INTEGRATED RELEASE FEATURE FOR PAWL-LATCHING DEVICES

(71) Applicant: HellermannTyton Corporation, Milwaukee, WI (US)

(72) Inventors: Gerard G. Geiger, Jackson, WI (US); Giovanni Lewinski, Milwaukee, WI (US)

(73) Assignee: HellermannTyton Corporation, Milwaukee, WI (US)

( * ) Notice: Subject to any disclaimer, the term of this patent is extended or adjusted under 35 U.S.C. 154(b) by 0 days.

(21) Appl. No.: 16/876,722

(22) Filed: May 18, 2020

(65) Prior Publication Data
US 2020/0391916 A1    Dec. 17, 2020

Related U.S. Application Data

(60) Provisional application No. 62/860,424, filed on Jun. 12, 2019.

(51) Int. Cl.
*B65D 63/10*    (2006.01)
(52) U.S. Cl.
CPC .................... *B65D 63/1027* (2013.01)
(58) Field of Classification Search
CPC .......... B65D 2563/107; B65D 63/1027; B65D 63/1072; F16L 3/2334; H02G 3/32
See application file for complete search history.

(56) References Cited

U.S. PATENT DOCUMENTS

| 3,872,547 | A |   | 3/1975 | Caveney et al. |
| 3,908,233 | A | * | 9/1975 | Caveney ............... F16L 3/2334 24/16 PB |
| 3,965,538 | A | * | 6/1976 | Caveney ........... B65D 63/1072 24/16 PB |
| 4,009,509 | A | * | 3/1977 | McCormick .......... F16L 3/2334 24/16 PB |

(Continued)

FOREIGN PATENT DOCUMENTS

| EP | 2141397   | 1/2020 |
| FR | 2282062   | 3/1976 |
| WO | 1997013946 | 4/1997 |

OTHER PUBLICATIONS

"Extended European Search Report", EP Application No. 20177362. 9, dated Nov. 20, 2020, 6 pages.

*Primary Examiner* — Robert Sandy
*Assistant Examiner* — David M Upchurch
(74) *Attorney, Agent, or Firm* — Colby Nipper PLLC

(57) ABSTRACT

This document describes an integrated release feature for pawl-latching devices. In particular, the integrated release feature is integrally connected to a pawl that is connected to a locking head of the pawl-latching device. The locking head defines a slot that extends through the locking head and includes a first channel conjoined with a second channel. The pawl is disposed within the second channel and positioned internally to the locking head. The pawl has multiple pawl teeth to engage serrations on an elongate strap when the elongate strap is disposed within the first channel. The integrated release feature includes at least one wall shaped to define multiple sides of an open cavity in a midsection of the pawl for receiving a release tool, and the wall has opposing ends that both face the first channel and have one or more additional pawl teeth.

20 Claims, 12 Drawing Sheets

(56) References Cited

U.S. PATENT DOCUMENTS

| | | | | |
|---|---|---|---|---|
| 4,413,380 A | * | 11/1983 | Suzuki | F16L 3/2334 |
| | | | | 24/16 PB |
| 4,490,887 A | * | 1/1985 | Sarton | B65D 63/1072 |
| | | | | 24/16 PB |
| 5,193,250 A | * | 3/1993 | Caveney | B65D 63/1072 |
| | | | | 24/16 PB |
| 6,898,825 B1 | | 5/2005 | Charest | |
| 7,143,480 B2 | | 12/2006 | Igarashi | |
| 2014/0013552 A1 | * | 1/2014 | Liang | E05D 13/00 |
| | | | | 24/68 CD |
| 2018/0080580 A1 | | 3/2018 | Coukter | |

\* cited by examiner

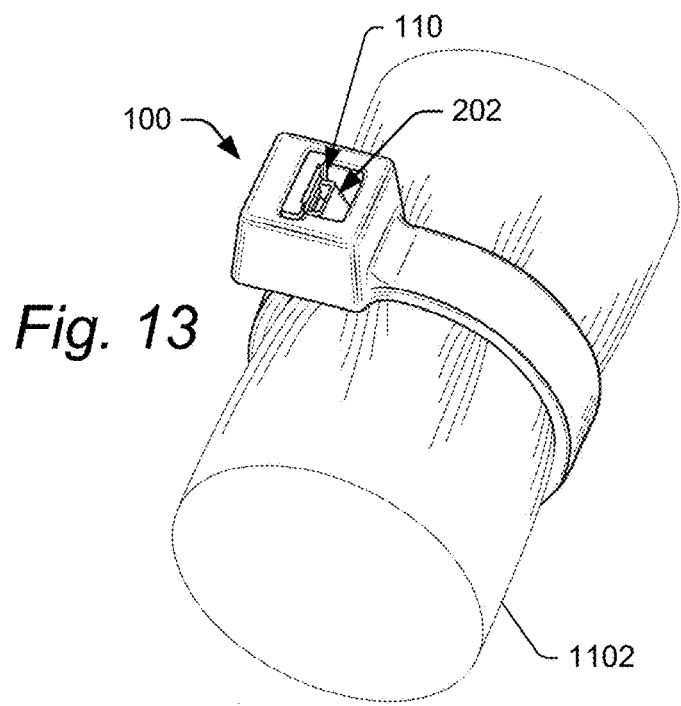
Fig. 13
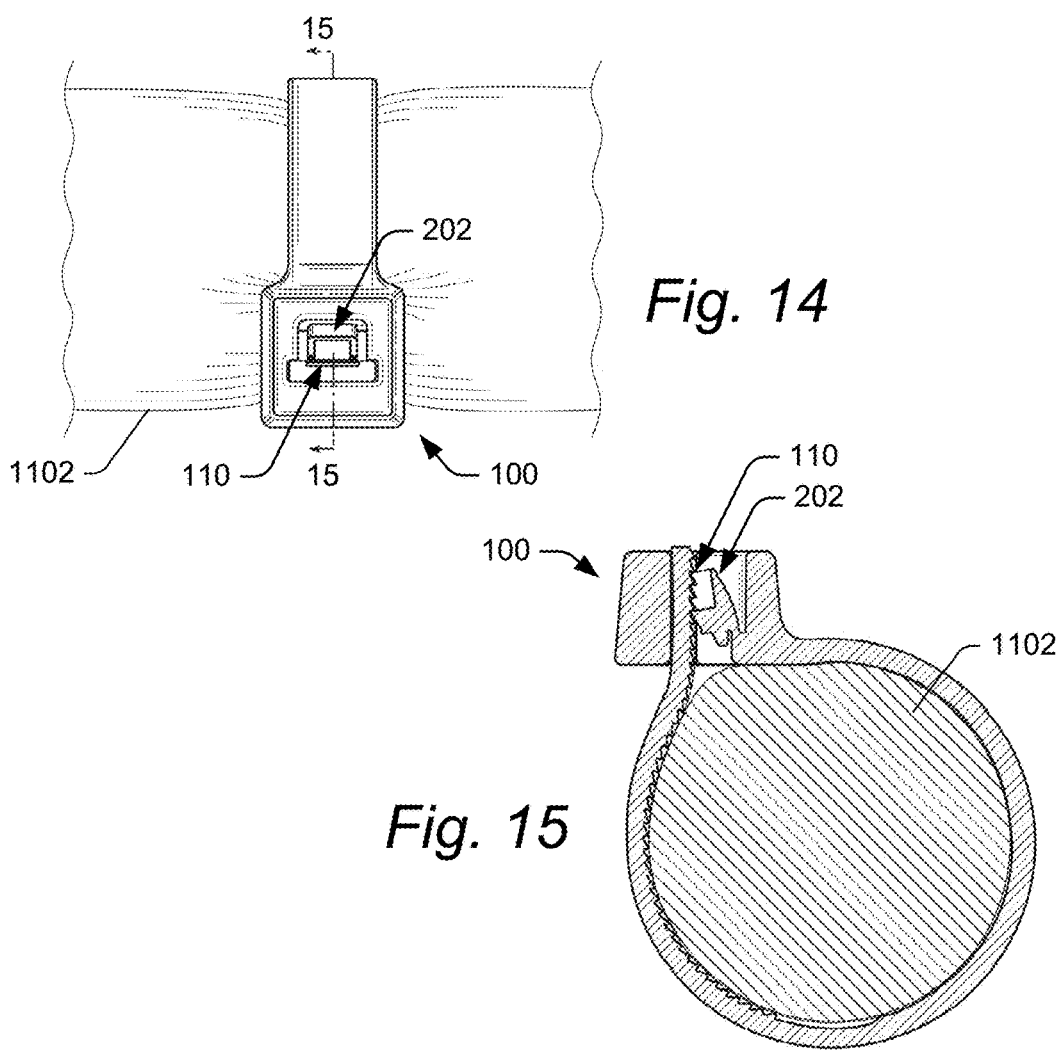
Fig. 14
Fig. 15

INTEGRATED RELEASE FEATURE FOR PAWL-LATCHING DEVICES

RELATED APPLICATION

This application claims priority under 35 U.S.C. § 119(e) to U.S. Provisional Patent Application No. 62/860,424, entitled "Cable Tie with Integrated Low Profile Release Feature" and filed on Jun. 12, 2019, the disclosure of which is incorporated in its entirety by reference herein.

BACKGROUND

Cable ties and other pawl-latching devices (e.g., cable ties, clips, clamps) have a long history of use for securing bundles of objects (e.g., wire-bundles). Many cable ties have been developed with release features, such as release tabs, that allow a user to release the cable tie from a secured position around a bundle, which is particularly useful when the cable tie is highly tensioned around the bundle. However, conventional release tabs have sharp protruding edges that risk injury to a user, such as when the user is installing the cable tie or attempting to remove it. In some cases, these sharp edges can cut holes in packaging bags, allowing nylon cable ties, for example, to dehydrate in dry environments and become prone to breakage. Many conventional release tabs can bend, deform, and yield without releasing when a user attempts to release a cable tie that is highly-tensioned around a bundle, making the release tab inoperable and significantly increasing the risk of damage to the bundle when removing the cable tie through other means, such as cutting.

Conventional release tabs can also allow a release tool, such as a flat-blade screwdriver, to slip out of engagement with the release tab, risking injury to the user or damage to the bundle. The protruding release tabs may also be vulnerable to inadvertent release due to accidental contact by a user or tool during installation or maintenance, particularly when the cable tie is under low tension. The protruding release tabs also interfere with installation tools that tension the cable tie during installation and cut off excess material from the cable tie, preventing the installation tool from cutting the cable tie flush with the cable-tie head. The inability to cut strap close to the head due to an interfering protruding release tab results in a protruding sharp cutoff strap and creates an additional sharp protrusion above the cable-tie head and also risks inadvertent release of the release tab by the installation tool.

SUMMARY

This document describes an integrated release feature for pawl-latching devices. In particular, the integrated release feature is integrally connected to a pawl that is connected to a locking head of the pawl-latching device. The locking head defines a slot that extends through the locking head and includes a first channel conjoined with a second channel. The first channel is configured to receive an elongate strap having a plurality of serrations. The pawl is disposed within the second channel of the slot and positioned internally to the locking head. The pawl has multiple pawl teeth configured to engage the serrations on the elongate strap when the elongate strap is disposed within the first channel. The integrated release feature includes at least one wall shaped to define multiple sides of an open cavity in a midsection of the pawl for receiving a release tool, and the wall has opposing ends that both face the first channel. The integrated release feature also includes one or more additional pawl teeth disposed on the opposing ends of the wall that face the first channel.

In yet other aspects, a pawl-latching device is disclosed, which includes an elongate strap, a locking head, a pawl, and an integrated release feature. The elongate strap has a head end, a tail end that is opposite the head end, and a plurality of serrations disposed on one side of the elongate strap. The locking head is integrally connected to the head end of the elongate strap. In addition, the locking head defines a slot that extends through the locking head and includes first and second conjoined channels. The first channel is configured for receiving the strap with the plurality of serrations. The pawl is disposed within the second channel via a hinged connection to the locking head and positioned below a top surface of the locking head. The pawl includes a plurality of pawl teeth disposed on a face of the pawl that faces the first channel. The plurality of pawl teeth are configured to engage one or more serrations of the plurality of serrations when the tail end of the elongate strap is disposed within the first channel. The integrated release feature is integrally connected to the pawl. Also, the integrated release feature includes a multi-walled structure defining multiple sides of the cavity and having ends facing the first channel. The multi-walled structure defines a cavity in a midsection of the pawl that is configured to receive a release tool. The ends of the multi-walled structure have one or more additional pawl teeth.

This summary is provided to introduce simplified concepts for an integrated release feature for pawl-latching devices, which are further described below in the Detailed Description and Drawings. This summary is not intended to identify essential features of the claimed subject matter, nor is it intended for use in determining the scope of the claimed subject matter.

BRIEF DESCRIPTION OF THE DRAWINGS

The details of one or more aspects of an integrated release feature for pawl-latching devices are described in this document with reference to the following drawings. The same numbers are used throughout the drawings to reference like features and components:

FIG. 13 illustrates an isometric view of an example implementation of a high-tensioned for a pawl-latching device secured around a compressible bundle.

FIG. 14 illustrates a top plan view of the high-tensioned pawl-latching device from FIG. 13.

FIG. 15 illustrates a sectional view of the high-tensioned pawl-latching device from FIG. 14, taken along section line 15-15.

DETAILED DESCRIPTION

Figure 1:
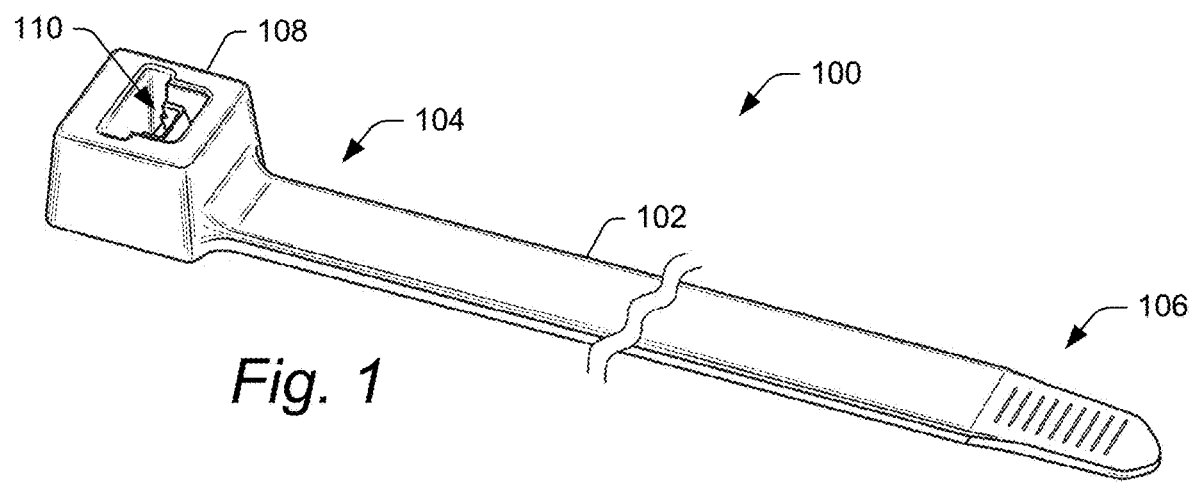
FIG. 1 illustrates an example implementation of a pawl-latching device with an integrated release feature.

The details of one or more aspects of an integrated release feature for pawl-latching devices are described below. Conventional release features for pawl-latching devices, such as cable-tie assemblies, have sharp protruding release tabs that can injure a user or cut into packaging bags. The release tabs can also bend, deform, and yield when a user attempts to release a pawl-latching device that is highly tensioned around a bundle, causing the release tab to become inoperable. Additionally, protruding release tabs can interfere with installation tools and can also be susceptible to inadvertent release. The term "bundle" used herein refers to any object or objects that may be secured by the pawl-latching device 100. Common examples of a bundle, which is securable via an example pawl-latching device, include a wire-bundle or a bundle of cables, lines, hoses, tubing, conduit, or other objects (e.g., elongate objects) that need securing. Additional example implementations of securing a bundle include securing vines to trellises, small trees to stakes, animal fencing to poles, etc.

The integrated release feature described herein is connected to a pawl mechanism, such as a pawl, within a locking head (also referred to as a cable-tie head) of the pawl-latching device. The integrated release feature is positioned internally to the locking head such there are no protruding parts that extend outside of the locking head, which in contrast to conventional protruding release features, eliminates the risk of injury to a user or damage to a neighboring material.

The integrated release feature may be formed by a bifurcation in a portion of one or more pawl teeth, creating a walled structure. In addition, the integrated release feature includes partial rows of pawl teeth (e.g., the remaining portion of the bifurcated pawl teeth) for improved pawl-to-strap-serration engagement strength (also referred to as loop tensile strength) relative to conventional cable-tie pawls.

In aspects, the walled structure is a reinforced structure, as described in detail below, that reduces the likelihood of bending, deforming, and. For example, the walled structure may form a U-shaped structure that is size-matched to a release tool, such as a flat-blade screwdriver, thus confining the release movement of the screwdriver to protect gouging adjacent, external components to the installer's hands. Thus, the reinforced structure of the integrated release feature provides structural rigidity and improved reliability for disengaging the pawl mechanism, particularly when the pawl mechanism is engaged at high forces (e.g., high tensile force in the strap of the pawl-latching device causing high engagement force between the strap serrations and the pawl teeth), without bending, deforming, or otherwise failing. Further, the integrated release feature can be used to convert many standard pawls, such as cable-tie pawls, into releasable pawls without modifying the outside-overall dimensions of the part.

EXAMPLE ENVIRONMENT

FIG. 1 illustrates an example implementation of a pawl-latching device 100 (e.g., cable-tie assembly) in which one or more aspects of an integrated release feature can be implemented. The pawl-latching device 100 includes an elongate strap 102 (or band) having a head end 104 and a tail end 106 that is opposite the head end 104. The pawl-latching device 100 also includes a locking head 108 integrally connected to the head end 104 of the strap 102. The strap 102 also includes a plurality of serrations (not shown in FIG. 1 because the serrations are disposed on a bottom side of the strap) on one lengthwise side of the strap, which are configured to engage a pawl mechanism 110 within the locking head 108. As is described in more detail below, the pawl mechanism 110 is disposed within an interior of the locking head 108. The pawl-latching device 100 described herein is merely an example in which the integrated release feature can be implemented; any suitable pawl-latching device can be used to implement the integrated release feature, such as clips and clamps.

Figure 2:
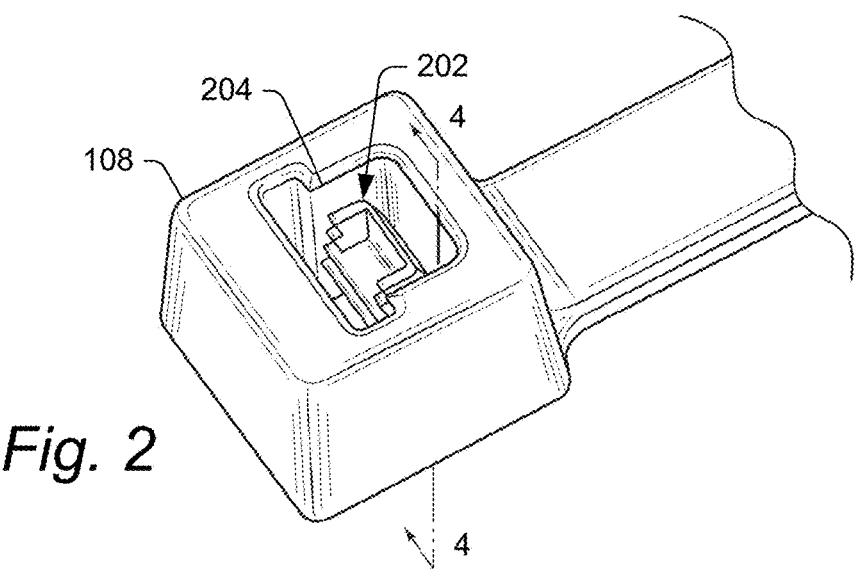
FIG. 2 illustrates an isometric view of a locking head of the pawl-latching device from FIG. 1 with an integrated release feature according to implementations described herein.
Figure 3:
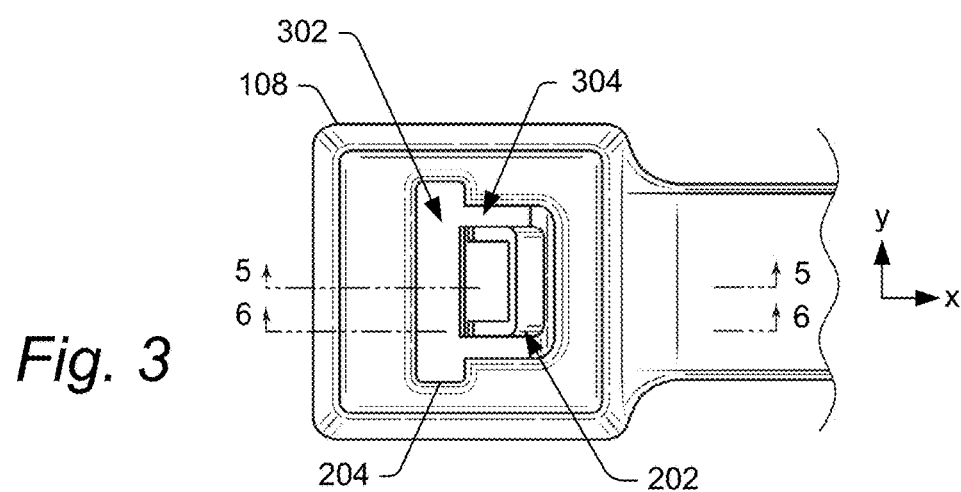
FIG. 3 illustrates a top plan view of the locking head of the pawl-latching device from FIG. 1.

FIG. 2 illustrates an isometric view of the locking head 108 of the pawl-latching device 100 from FIG. 1 with an integrated release feature 202 according to implementations described herein. FIG. 3 illustrates a top plan view of the locking head 108 of the pawl-latching device 100 from FIG. 2. The locking head 108 defines a slot 204 having a first channel 302 and a second channel 304 conjoined with the first channel 302. The slot extends through the locking head 108. The first channel 302 is configured to receive the strap 102, such as the tail end 106 of the strap 102. The pawl mechanism 110 is disposed within the second channel 304 such that when the strap 102 is disposed within the first channel 302, the pawl mechanism engages the strap 102 to allow unidirectional movement of the strap 102 through the first channel 302 and resist movement of the strap 102 in an opposite direction. More detail is discussed below.

Figure 4:
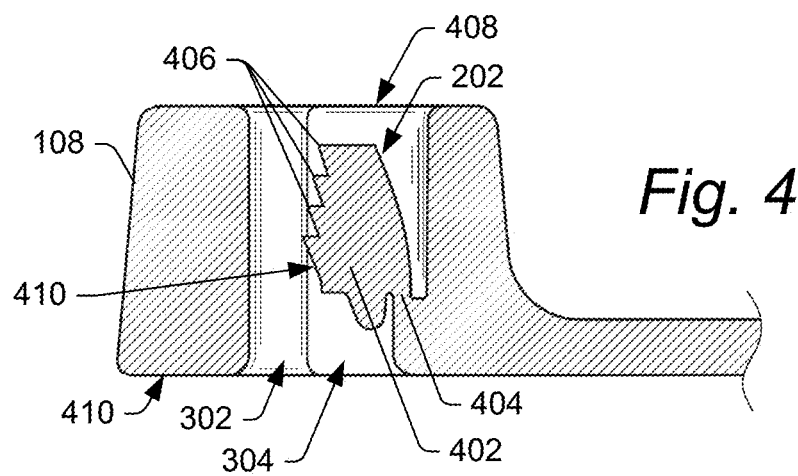
FIG. 4 illustrates a front sectional view of the locking head from FIG. 2, taken along section line 4-4.

FIG. 4 illustrates a front sectional view of the locking head 108 from FIG. 2, taken along section line 4-4. The pawl mechanism 110 includes a pawl 402 tethered inside the locking head 108 forming a hinged connection 404 within the second channel 304 of the slot 204. The pawl includes a plurality of pawl teeth 406 facing the first channel 302. The pawl teeth comprise protrusions extending from the pawl 402 toward the first channel 302 and angled toward one end of the first channel 302, such as toward a top surface 408

(outer surface) of the locking head 108. The pawl teeth 406 are configured to engage the serrations on the tail end 106 of the strap 102 when a portion of the tail end 106 of the strap 102 is disposed within the first channel 302. The pawl 402 is positioned internal to the locking head 108 such that the pawl 402 does not extend above the top surface 408 of the locking head 108 or below a bottom surface 410 of the locking head 108 (e.g., the pawl 402 does not protrude longitudinally out of the second channel 304). The pawl 402 is completely contained within the locking head 108, which substantially eliminates the risk of the pawl 402 having a sharp protrusion that could injure a user or damage adjacent routed material overlapping soft bundles and/or hoses, or the pawl-latching device's packaging bag.

Figure 5:
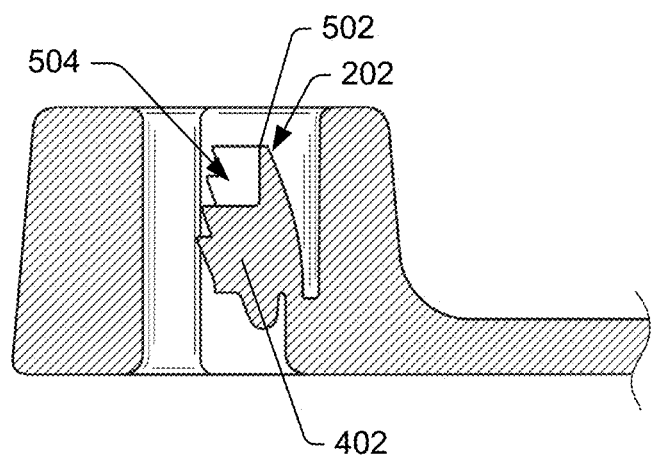
FIG. 5 illustrates a front sectional view of the locking head from FIG. 3, taken along section line 5-5.
Figure 6:
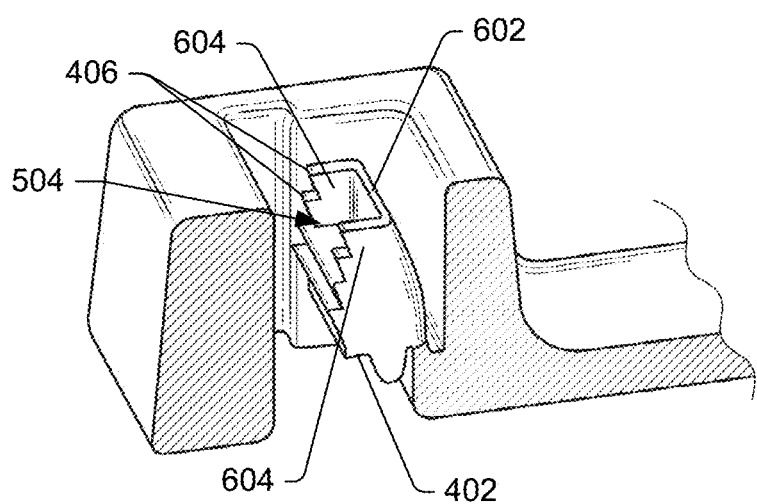
FIG. 6 illustrates a perspective sectional view of the locking head from FIG. 3, taken along section line 6-6.

FIG. 5 illustrates a front sectional view of the locking head from FIG. 3, taken along section line 5-5. FIG. 6 illustrates a sectional view of the locking head from FIG. 3, taken along section line 6-6. As illustrated in FIGS. 5 and 6 (and also shown in FIGS. 2 and 3), the pawl 402 includes the integrated release feature 202. The integrated release feature 202 is defined by a walled structure 502 integrally connected to the pawl 402. The walled structure 502 has at least one wall shaped to define an open cavity 504 in a midsection of the pawl 402 with an opening for receiving a tip of a release tool, such as a flat-blade screwdriver.

In the illustrated example in FIG. 6, the walled structure 502 is a multi-walled structure having a back wall 602 and two side walls 604. In aspects, the back wall 602 is merged with the side walls 604 to form a U-shaped structure around the cavity 504. Each end of the walled structure 502 includes one or more pawl teeth, such as the pawl teeth 406, facing the first channel 302. The back wall 602 is configured to reinforce the side walls 604 to provide increased wedging strength during high-loop tensile-strength applications, examples of which are described below with respect to FIGS. 13-15. Further, integration of the side walls 604 with the back wall 602 provides reinforcement strength to the back wall 602 for disengaging the pawl teeth 406 when the pawl teeth are compressively engaged with the serrations on the tail end 106 of the strap 102 and a release tool applies a force against the back wall 602 away from the strap 102.

In aspects, the cavity 504 is formed by a bifurcation (or gap, recess, void, absence, etc.) in a portion of the pawl 402, including a portion of the pawl teeth 406 facing the first channel 302. In the example shown in FIGS. 5 and 6, the bifurcation in the portion of the pawl 402 includes a middle portion of two rows of the pawl teeth 406 that would have contacted the serrations on the tail end 106 of the strap 102 when the strap 102 is disposed within the first channel 302. The bifurcation in the portion of the pawl 402 can include a portion of any suitable number of rows of the pawl teeth 406, including one, two, or three rows of the pawl teeth 406. The cavity 504 formed by the walled structure 502 can be defined to fit a contour and size of a tip of the release tool, which may be an industry-standard flat-blade screwdriver or other object usable to release the pawl mechanism 110. The walled structure 502 may be shaped to fit a contour of a head or tip of the release tool to guide the release tool into the cavity 504 and prevent the release tool from slipping out of engagement with the back wall 602. The walled structure 502 is shaped such that the remaining portion of the pawl teeth 406 (the portion on opposing sides of the bifurcation) disposed on the ends of the walled structure 502 is arranged in two substantially parallel columns separated by the cavity 504.

Any suitable shape for the walled structure 502 can be used. For example, the walled structure 502 may be a single wall that is rounded to define a half-circle or half-oval to fit a rounded tip of the release tool, with one or more pawl teeth being disposed on opposing ends of the single wall and facing the first channel 302. Alternatively, the walled structure 502 may include two walls forming a V-shape. As shown in the illustrated example in FIG. 6, the walled structure 502 may include a three-walled structure forming a U-shape. In yet other examples, the walled structure 502 may include four or more walls forming a shape suitable to fit the contour of the release tool.

In implementations, due to sizing restrictions in small locking heads, it may be useful to implement the walled structure 502 to form fit to a thin release tool, such as a flat-blade screwdriver. Accordingly, the side walls 604 may be separated by a distance (width of the cavity 504, e.g., along a y-axis in FIG. 3) that is within a range of approximately 0.8 mm to approximately 10.0 mm to size-match to an industry-standard flat-blade screwdriver. The back wall 602 may be offset from a face of the pawl 402 facing the first channel 302 by a distance (depth of the cavity 504, e.g., along an x-axis in FIG. 3) that is within a range of approximately 0.5 mm to approximately 2.0 mm. The walled structure 502 (the side walls 604 and the back wall 602) may have a height (height of the cavity 504) that is within a range of approximately 1.0 mm to approximately 3.0 mm. In FIGS. 5 and 6, the height of the walled structure 502 may be substantially equivalent to the height of two rows of the pawl teeth 406, or approximately 2.0 mm. In this embodiment, the back wall 602 is illustrated as having substantially the same height as the side walls 604. However, the back wall 602 may be raised above the side walls 604 or the side walls 604 may be raised above back wall 602. Additionally, the back wall 602 may have a thickness that is substantially the same as a thickness of the side walls 604. Alternatively, the back wall 602 may be thinner than the side walls 604 or the back wall 602 may be thicker than the side walls 604.

Figure 7:
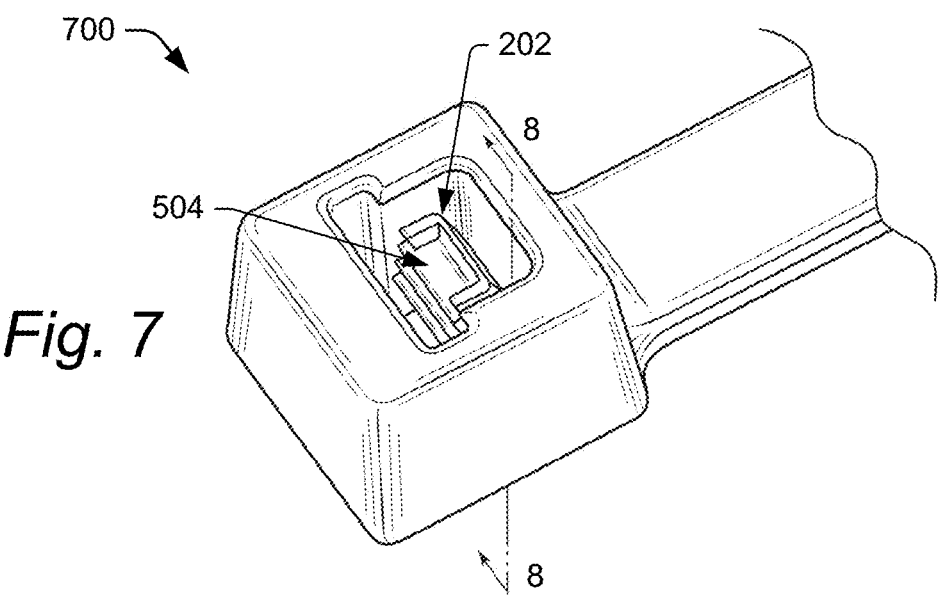
FIG. 7 illustrates an isometric view of an example implementation of a locking head with an integrated release feature according to implementations described herein.
Figure 8:
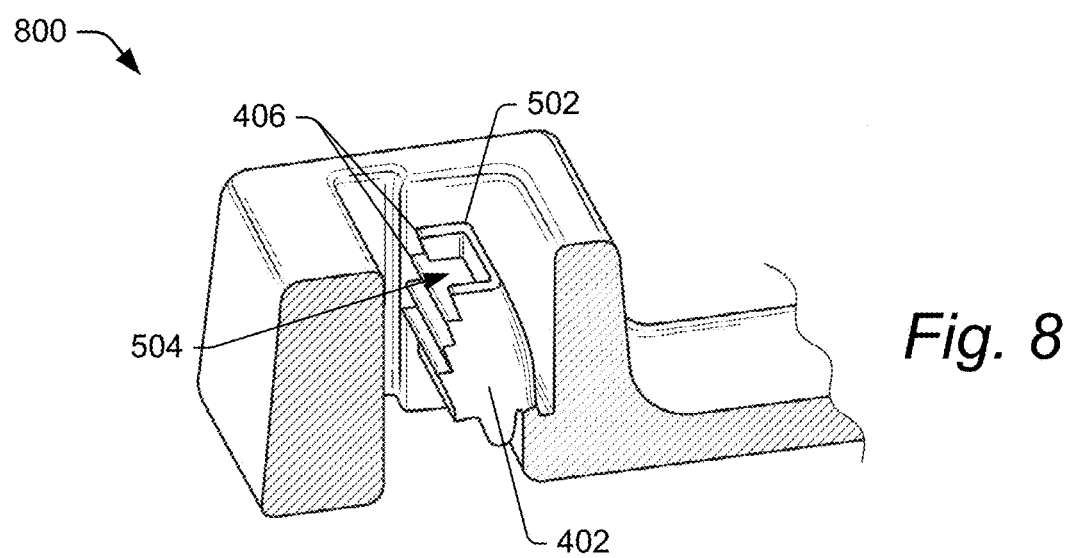
FIG. 8 illustrates a perspective sectional view of the locking head from FIG. 7, taken along section line 8-8.

FIG. 7 illustrates an isometric view of an example implementation of a locking head with an integrated release feature according to implementations described herein. FIG. 8 illustrates a perspective sectional view of the locking head from FIG. 7, taken along section line 8-8. As illustrated in FIGS. 7 and 8, the integrated release feature 202 may be implemented with a shorter height relative to the implementations described above with respect to FIGS. 1-6. Here, the height of the walled structure 502 may be substantially equivalent to the height of one row of the pawl teeth 406, or approximately 1.0 mm. This shorter height of the walled structure 502 may be useful for higher-load applications, such as when the pawl-latching device 100 is highly tensioned around a bundle, providing a high load (e.g., high locking-engagement force) on the pawl 402 and its pawl teeth 406. A taller walled structure 502 (and a deeper cavity 504 between additional rows of the pawl teeth 406) may weaken the wedging strength of the portions of pawl teeth 406 on the ends of the side walls 604; however, the option exists to provide an increased width of each side wall 604 to achieve a higher wedging strength.

Figure 9:
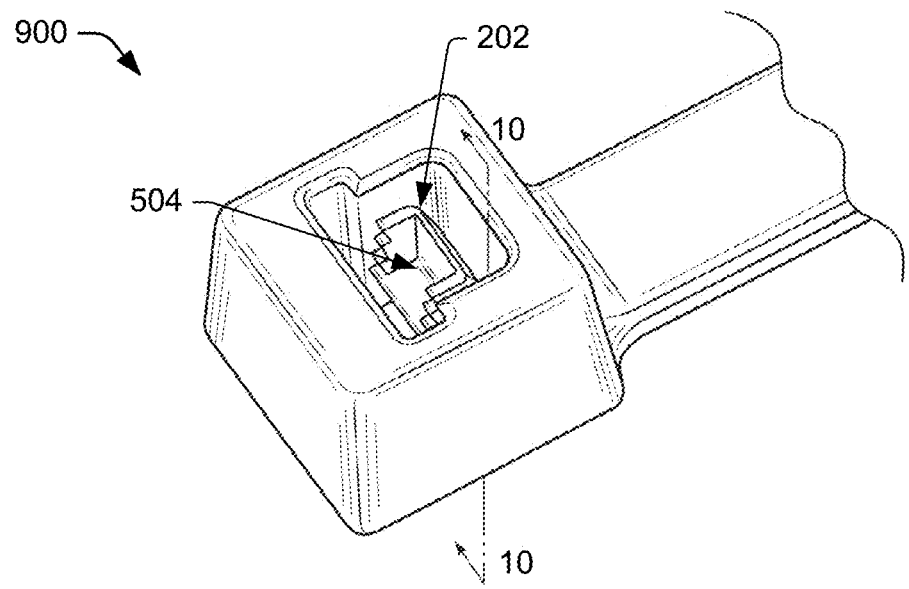
FIG. 9 illustrates an isometric view of an example implementation of a locking head with an integrated release feature according to implementations described herein.
Figure 10:
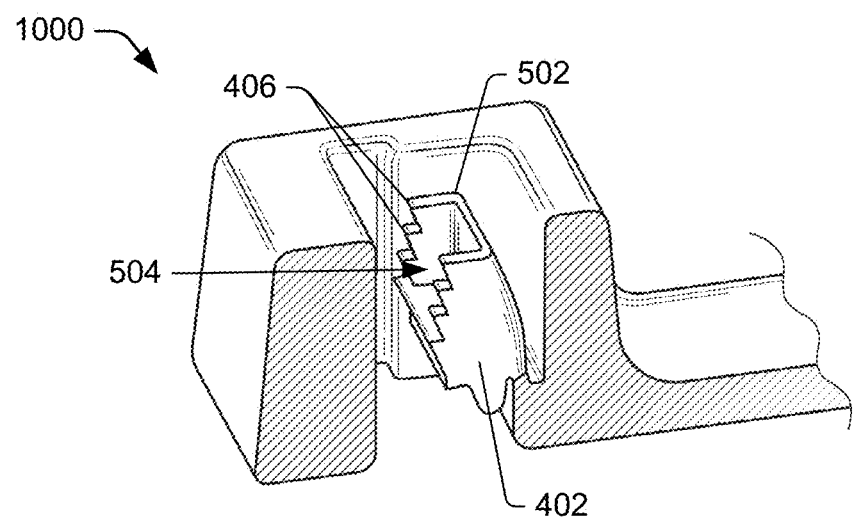
FIG. 10 illustrates a perspective sectional view of the locking head from FIG. 9, taken along section line 10-10.

FIG. 9 illustrates an isometric view of an example implementation of a locking head with an integrated release feature according to implementations described herein. FIG. 10 illustrates a perspective sectional view of the locking head from FIG. 9, taken along section line 10-10. As illustrated in FIGS. 9 and 10, the integrated release feature 202 may be implemented with a greater height relative to the implementations described above with respect to FIGS. 1-8. Here, the height of the walled structure 502 may be substantially equivalent to the height of three rows of the pawl teeth 406, or approximately 3.0 mm. This greater height of the walled structure 502 may be useful when the pawl-latching device 100 is placed under lower relative tension around a bundle, providing a lighter load (e.g., smaller locking-engagement force) on the pawl 402 and its pawl teeth 406. Constructing the integrated release feature 202 in this way may provide a larger cavity 504 and additional leveraging for the release tool to more easily disengage the pawl 402 from the strap 102, an example of which is illustrated in FIGS. 16A through 16F.

Figure 11A:
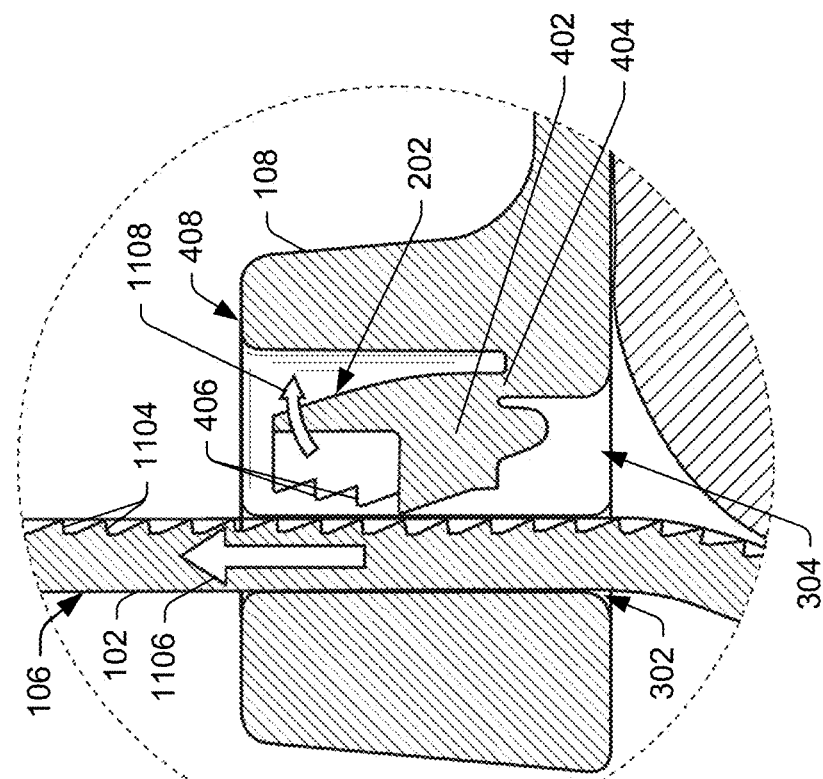
FIGS. 11A and 11B illustrate an example implementation of a pawl-latching device being secured around a bundle.
Figure 11B:
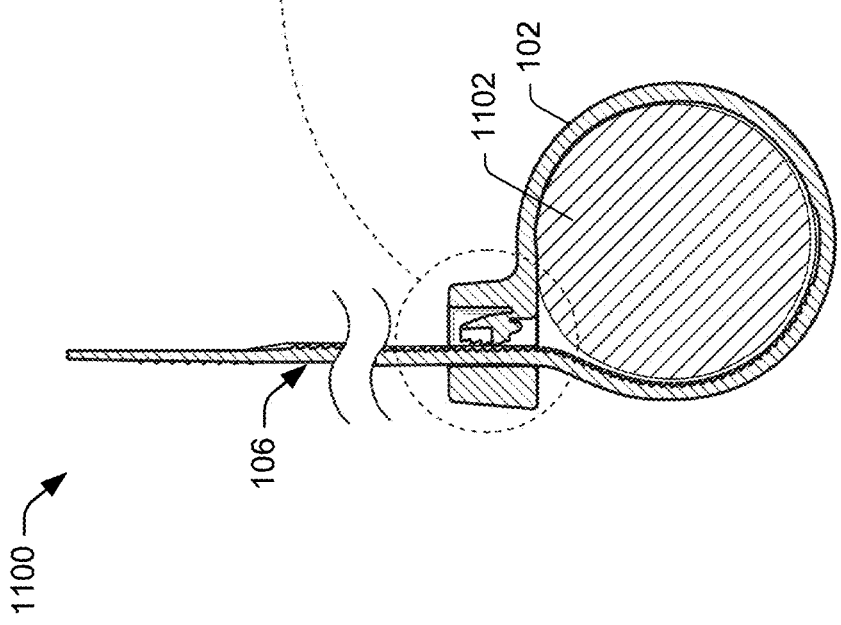

FIGS. 11A and 11B illustrate an example implementation of a pawl-latching device being secured around a bundle. As illustrated, the strap 102 of the pawl-latching device 100 is wrapped around a bundle 1102 and the tail end 106 of the strap 102 is inserted through the first channel 302 such that serrations 1104 on the strap 102 face the pawl teeth 406 of the pawl 402 located in the second channel 304. As the strap 102 moves longitudinally through the first channel 302 (as indicated by arrow 1106), the angled portion of the serrations engages the angle portion of the pawl teeth 406 on the pawl 402, causing the pawl 402 to rotate away from the strap 102 about its hinged connection 404 to the locking head 108, as indicated by arrow 1108. The pawl 402 and the integrated release feature 202 remain below the top surface 408 of the locking head 108, such that the pawl 402 does not protrude longitudinally out of the second channel 304.

Figure 12A:
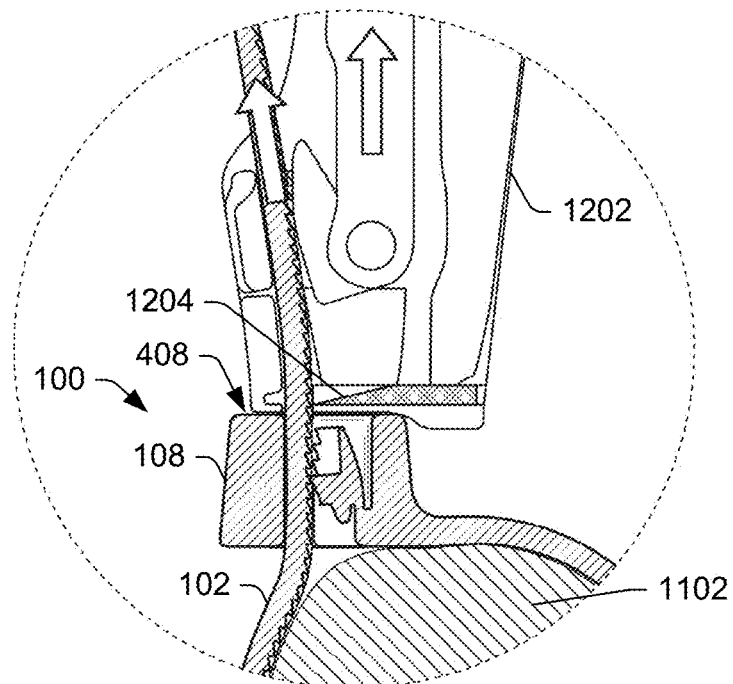
FIGS. 12A and 12B illustrate an example implementation of the pawl-latching device, from FIGS. 11A and 11B, being installed by an installation tool.
Figure 12B:
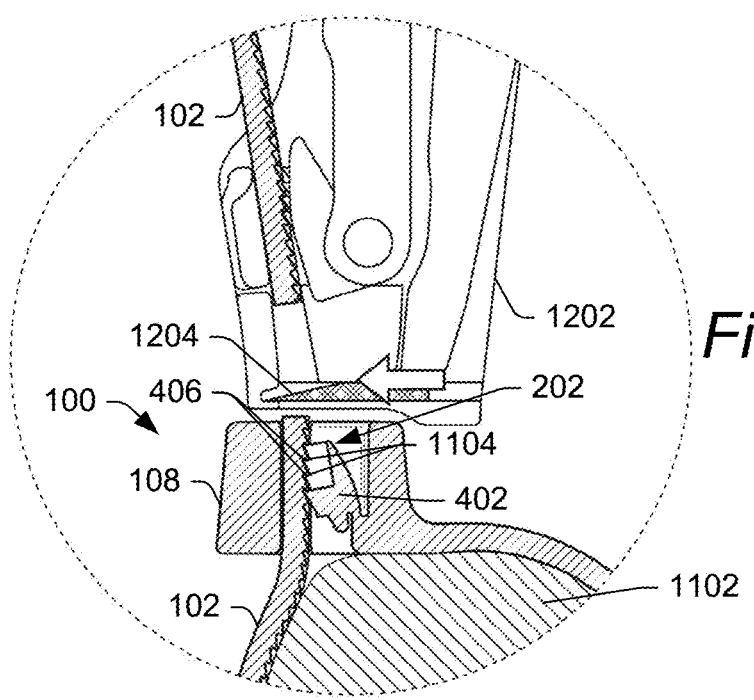

FIGS. 12A and 12B illustrate an example implementation of the pawl-latching device, from FIGS. 11A and 11B, being installed by an installation tool. In implementations, an installation tool 1202 can be used to apply tension to the pawl-latching device 100 and also shear off excess length of the strap 102 that extends above the top surface 408 of the locking head 108. In FIG. 12A, the installation tool 1202 is applying tension to the pawl-latching device 100 by pulling the strap 102 while pushing on the top surface 408 of the locking head 108. In FIG. 12B, the installation tool 1202 uses a blade 1204 to shear the strap 102. Sequentially, the pawl 402 rotates toward the strap 102, enabling the pawl teeth 406 on the pawl 402 to engage the serrations 1104 on the strap 102 and secure the pawl-latching device 100 in place. Because the pawl-latching device 100 is tensioned around the bundle 1102, when the strap 102 is sheared, the remaining strap tension is momentarily released until the pawl teeth 406 engage serrations 1104 on the strap 102; thereby moving the strap in a reverse direction through the first channel 302 and toward the bundle 1102. Further, because the pawl 402 and the integrated release feature 202 are positioned internally to the locking head 108, the installation tool can shear the strap 102 substantially flush with the top surface 408 of the locking head 108 to substantially remove any protruding sharp edges on the strap 102 that could pose a risk of injury to a user or damage to adjacent routed bundles, hoses, etc.

FIG. 13 illustrates an isometric view of an example implementation of a high-tensioned pawl-latching device secured around a compressible bundle. FIG. 14 illustrates a top plan view of the high-tensioned pawl-latching device from FIG. 13. FIG. 15 illustrates a sectional view of the high-tensioned pawl-latching device from FIG. 14, taken along section line 15-15. In some cases, the pawl-latching device 100 is highly tensioned around the bundle 1102 such that the bundle 1102 becomes compressed and deformed. A highly-tensioned pawl-latching device can be difficult to release using the conventional single-walled release tab feature, which may bend in the process and become damaged; thereby preventing the necessary leverage to release the pawl from being achievable. Consequently, if the release feature of the pawl mechanism fails, alternate methods to remove the pawl-latching device 100 from the compressed bundle 1102 will be required, such as using a cutting tool, which can be extremely difficult to cut a highly-tensioned strap around the compressed bundle 1102 without damaging the bundle 1102. Accordingly, the integrated release feature 202 provides a high reliability of performance for disengaging the pawl mechanism 110 without risking damage to the bundle 1102.

Figure 16A:
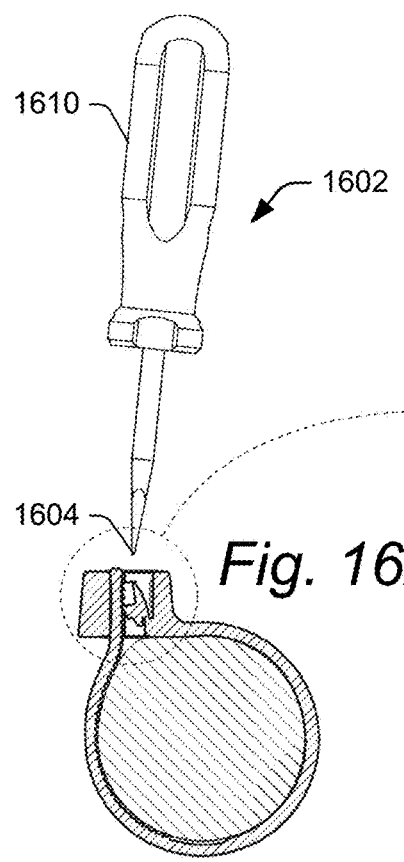
FIGS. 16A through 16F illustrate an example sequence of the high-tensioned pawl-latching device from FIG. 15 being released by a release tool interfacing with the integrated release feature.
Figure 16B:
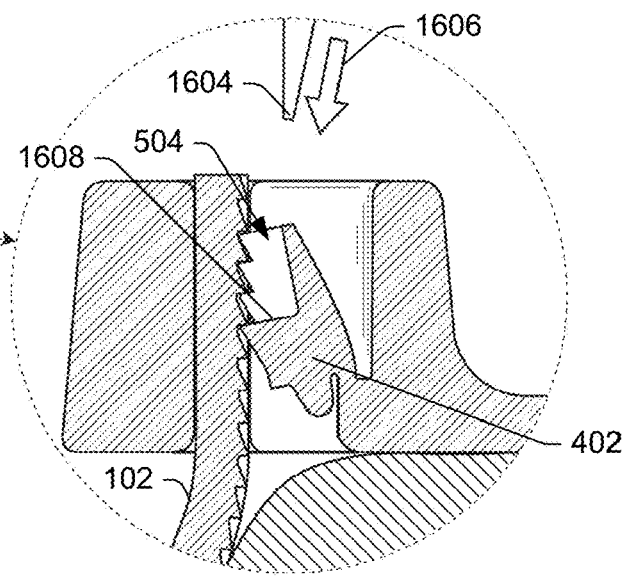
Figure 16C:
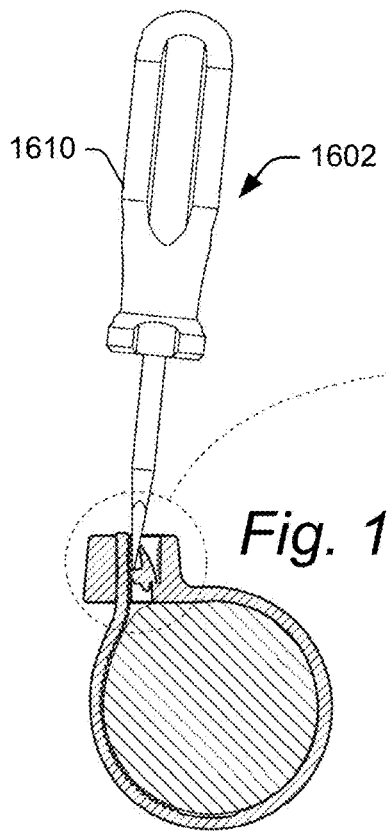
Figure 16D:
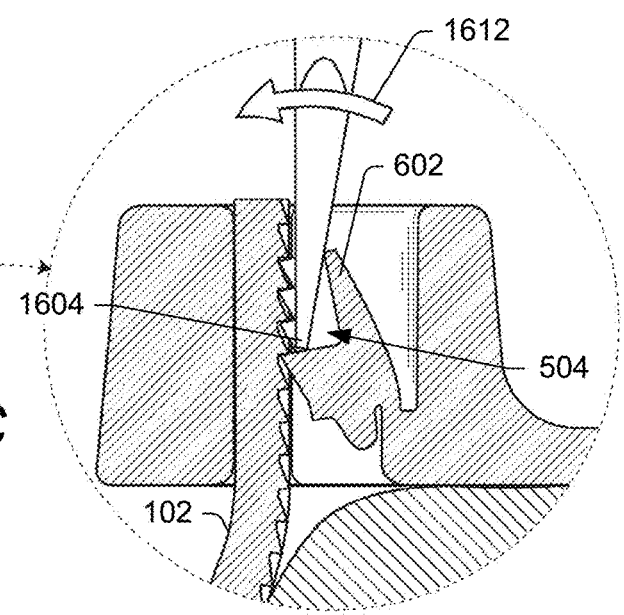

FIGS. 16A through 16F illustrate an example sequence of the high-tensioned pawl-latching device from FIG. 15 being released by a release tool interfacing with the integrated release feature. Here, a release tool 1602 is a flat-blade screwdriver. The release tool 1602 includes a tip 1604 that is inserted into the cavity 504 defined by the integrated release feature 202, as indicated by arrow 1606. When the tip 1604 of the release tool 1602 is received into the cavity 504 and abuts a planar surface 1608 of the pawl 402 that defines a bottom of the cavity 504, the release tool 1602 can be rotated either toward or away from the strap 102. In FIG. 16D, the release tool 1602 is rotated such that a handle 1610 of the release tool 1602 is rotated toward the strap 102, as indicated by arrow 1612, and the tip 1604 of the release tool 1602 is moved away from the strap 102 and toward the back wall 602. Alternatively, and as illustrated below in FIGS. 17A and 17B, the release tool 1602 can be rotated in an opposite direction.

Figures 16E, 16F:
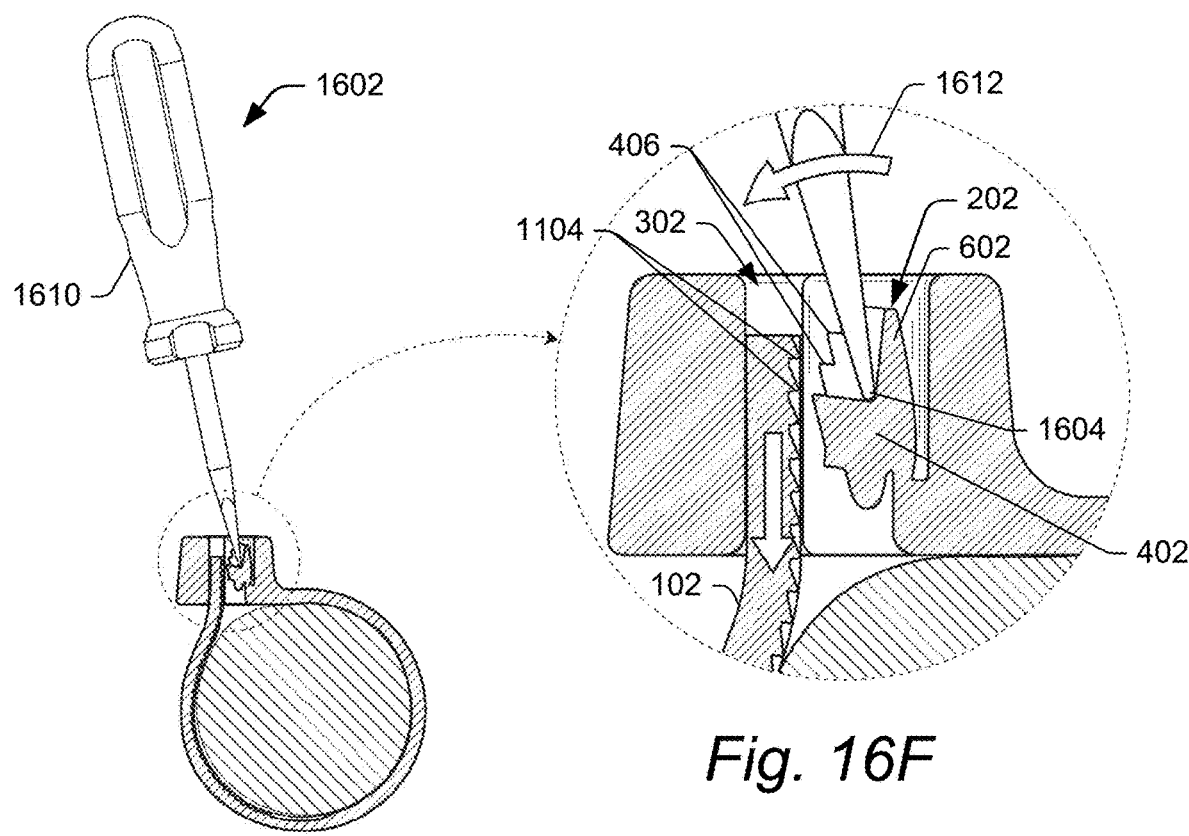

Continuing the example in FIGS. 16E and 16F, as the handle 1610 of the release tool 1602 is rotated toward the strap 102 (indicated by arrow 1612), the tip 1604 of the release tool 1602 applies a force to a bottom portion of the back wall 602 of the integrated release feature 202, causing the pawl 402 to rotate away from the strap 102, thereby disengaging the pawl teeth 406 from the serrations 1104 on the strap 102. Due to the tension in the strap 102, the strap 102 quickly moves longitudinally through the first channel 302 toward the bundle 1102.

Figures 17A, 17B:
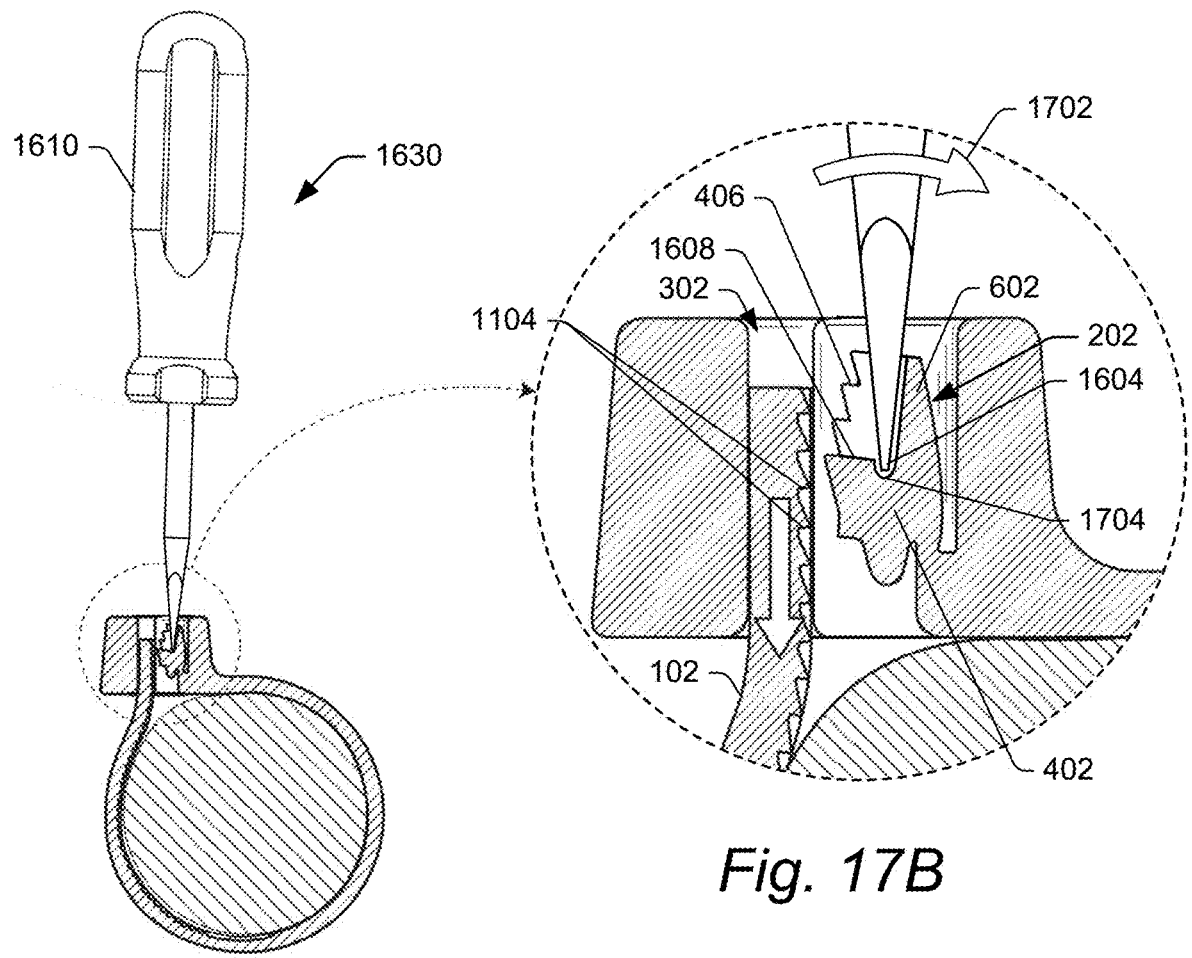
FIGS. 17A through 17B illustrate another example implementation of the high-tensioned pawl-latching device from FIG. 15 being released by a release tool interfacing with the integrated release feature.

FIGS. 17A through 17B illustrate another example implementation of the high-tensioned pawl-latching device from FIG. 15 being released by a release tool interfacing with the integrated release feature. Here, the handle 1610 of the release tool 1602 is rotated away from the strap 102. In some aspects, the tip 1604 of the release tool 1602 may abut the serrations 1104 on the strap 102 when rotating the release tool 1602 in this manner, resulting in the release tool 1602 applying a force to a top portion of the back wall 602 of the integrated release feature 202. As described above, the back wall 602 is reinforced by the side walls 604 to prevent bending or deformation of the back wall 602 that could result from the force applied to the top portion of the back wall 602. As illustrated, rotating the handle 1610 of the release tool 1602 away from the strap 102, as indicated by arrow 1702, can disengage the pawl teeth 406 of the pawl 402 from the serrations 1104 on the strap 102.

In addition, the planar surface 1608 of the pawl 402 may include an indentation 1704. The indentation 1704 may be formed as a trench or channel extending longitudinally along the width of the planar surface 1608 of the pawl 402 between the side walls 604. The indentation 1704 may be formed to receive the tip 1604 of the release tool 1602 to prevent lateral movement (e.g., movement toward or away from the strap 102) of the tip 1604 of the release tool 1602 across the planar surface 1608.

Figure 18:
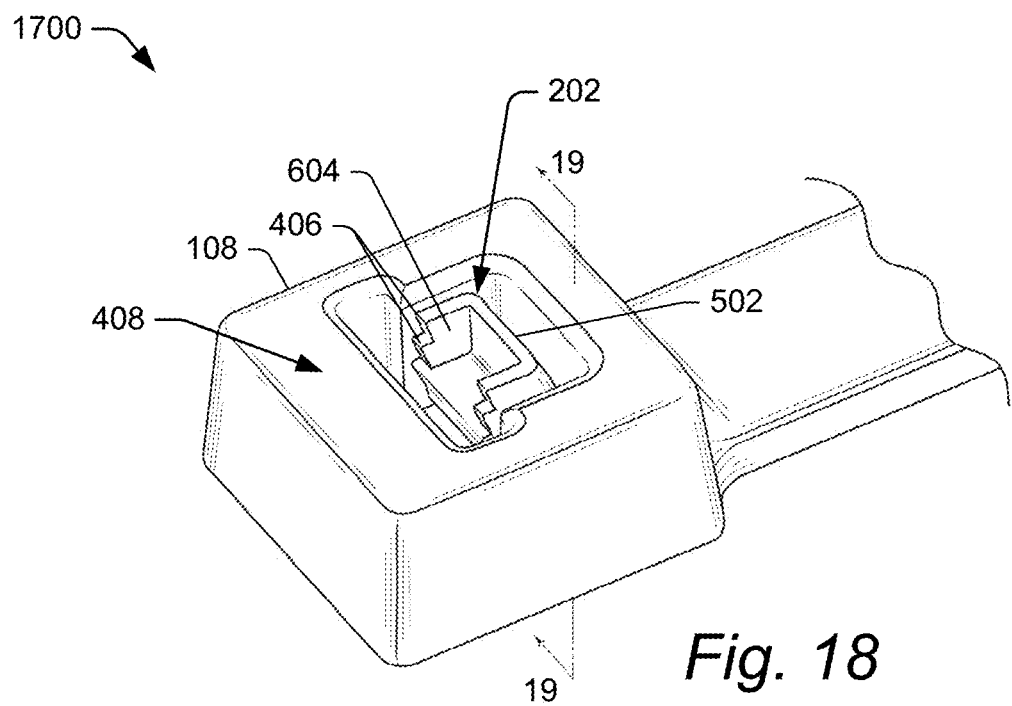
FIG. 18 illustrates an isometric view of an example implementation of a low-profile locking head with an integrated release feature.
Figure 19:
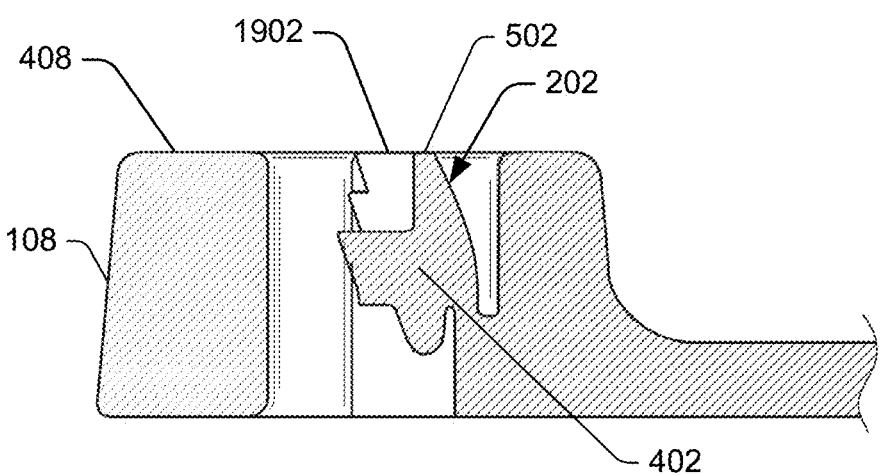
FIG. 19 illustrates a front sectional view of the low-profile locking head from FIG. 18, taken along section line 19-19.

FIG. 18 illustrates an isometric view of an example implementation of a low-profile locking head with an integrated release feature. FIG. 19 illustrates a front sectional view of the low-profile locking head from FIG. 18, taken along section line 19-19. The low-profile of the locking head 108 provides a less-protruding obstruction (the locking head 108) from bundled harnesses, cables, hoses, etc. If protruding locking heads 108 are in contact with adjacent or overlapping bundles on a moving vehicle, for example, these bundles may be subject to vibrations, jostling due to suspension bouncing, impacts if no suspension (e.g., on heavy equipment), and pulsating (if securing hydraulic lines), resulting in aggressive contact chafing (damage) between protruding heads and bundles. Therefore, lower-profile locking heads are desirable in vehicular applications. Further, the low-profile provides a lower height for the locking head 108, causing an assembled pawl-latching device 100 to be more ergonomic to work around with a less-protruding profile. Also, the low-profile head reduces the overall part size, and thus provides packing consolidation.

As illustrated, a top surface 1902 of the integrated release feature 202 is substantially flush (e.g., within 0.01 mm) with the top surface 408 of the locking head 108. The walled structure 502 forming the integrated release feature 202 may include one or more rows of pawl teeth 406 on the ends of the side walls 604. Although FIGS. 18 and 19 show the integrated release feature 202 having two rows of pawl teeth 406, other embodiments of the low-profile locking head may have any suitable number of rows of pawl teeth 406, such as one, two, three, or more. The low-profile locking head may have a height within a range of approximately 6.0 mm to approximately 8.0 mm. As above, the thickness of the back wall 602 may be substantially the same as that of the side walls 604. Alternatively, the back wall 602 may be thinner than the side walls 604 or the back wall 602 may be thicker than the side walls 604.

Figure 20:
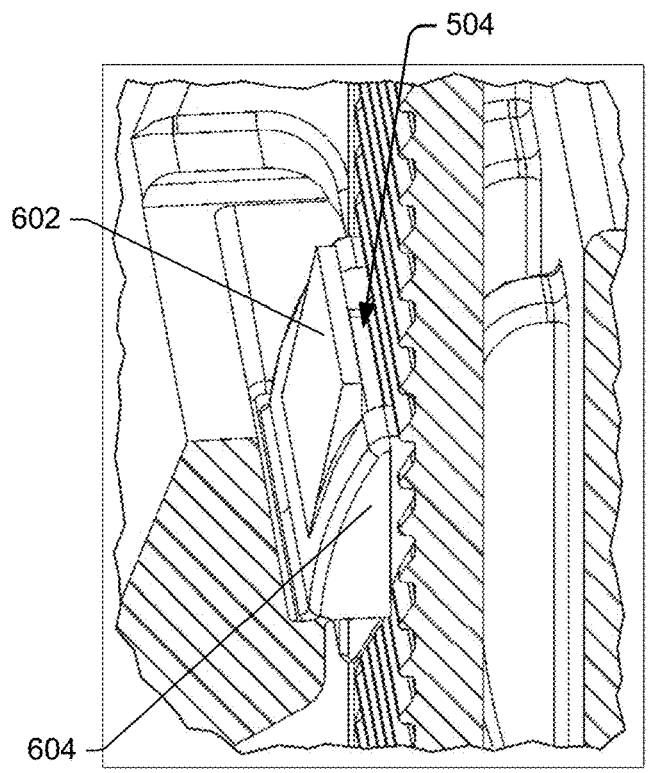
FIG. 20 illustrates a perspective sectional view of an alternative implementation of the locking head of the pawl-latching device from FIGS. 1-19.
Figure 21:
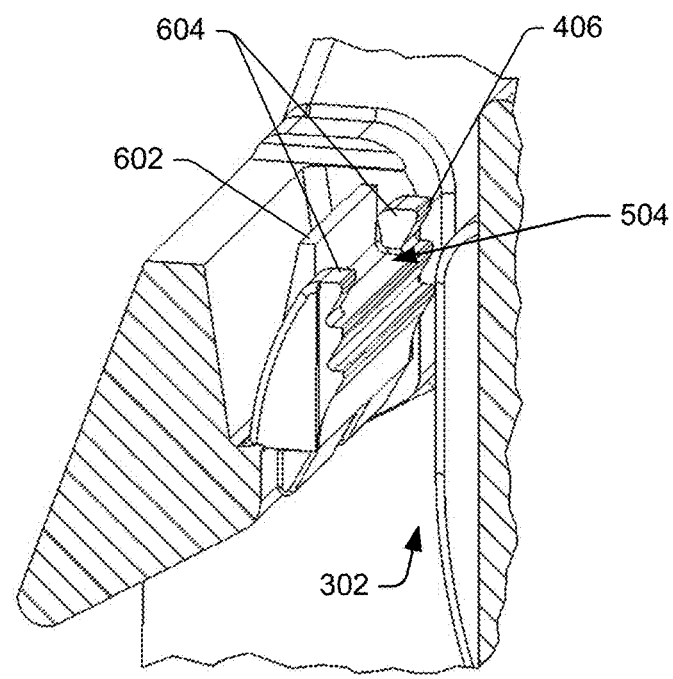
FIG. 21 illustrates another perspective sectional view of the locking head of the pawl-latching device from FIG. 20.

FIG. 20 illustrates a perspective sectional view of an alternative implementation of the locking head of the pawl-latching device from FIGS. 1-19. FIG. 21 illustrates another perspective sectional view of the locking head of the pawl-latching device from FIG. 20. Here, the back wall 602 is partially joined to each of the side walls 604, forming a U-shaped structure, but not completely merged together at each corner of the U-shaped structure. For example, at each corner of the U-shaped structure, a bifurcation exists between a portion of the back wall 602 and a portion of each side wall 604. In this embodiment, the back wall 602 is raised above the side walls 604. However, the back wall 602 may have a height that is substantially the same as the side walls 604 or the back wall 602 may be shorter than the side walls 604. The side walls 604 include first and second portions of one or more pawl teeth 406 facing the first channel 302. The cavity 504 of the integrated release feature 202 is formed based on a bifurcation between the first and second portions of the one or more pawl teeth 406. The side walls 604 guide the release tool into the cavity 504 and prevent lateral slippage of the release tool. Further, the pawl teeth 406 on the side walls 604 provide additional wedging strength during high-loop tensile-strength applications. The remaining features of the illustrated implementation are similar to those described above with respect to FIGS. 1-19.

The following are additional examples of techniques for an integrated release feature for pawl-latching devices.

Example 1

A pawl-latching device comprising: an integrated release feature integrally connected to a pawl that is connected to a locking head of the pawl-latching device, the locking head defining a slot that extends through the locking head and includes a first channel conjoined with a second channel, the first channel configured to receive an elongate strap having a plurality of serrations, the pawl disposed within the second channel of the slot and positioned internally to the locking head, the pawl having multiple pawl teeth configured to engage the plurality of serrations on the elongate strap when the elongate strap is disposed within the first channel, the integrated release feature comprising: at least one wall shaped to define multiple sides of an open cavity in a midsection of the pawl for receiving a release tool, the at least one wall having opposing ends that both face the first channel; and one or more additional pawl teeth disposed on the opposing ends of the at least one wall that face the first channel.

Example 2

The pawl-latching device as recited in example 1, wherein the pawl includes a planar surface defining a bottom of the cavity, the planar surface having an indentation configured to receive a tip of the release tool to prevent slidable movement of the tip of the release tool toward the first channel across the planar surface of the pawl.

Example 3

The pawl-latching device as recited in example 1, wherein: the at least one wall includes a back wall merged with two side walls to form a U-shaped structure around the cavity; and the one or more pawl teeth are disposed on an end of each side wall that faces the first channel.

Example 4

The pawl-latching device as recited in example 3, wherein the back wall is configured to reinforce the side walls to provide increased wedging strength for the one or more additional pawl teeth.

Example 5

The pawl-latching device as recited in example 3, wherein integration of the side walls with the back wall provides reinforcement strength to the back wall for releasing the one or more pawl teeth when the one or more pawl teeth are compressively engaged with one or more serrations of the plurality of serrations on the elongate strap and a force is applied to the back wall in a direction away from the elongate strap.

Example 6

The pawl-latching device as recited in example 1, wherein the cavity is formed by a bifurcation in a portion of the pawl including a portion of the one or more pawl teeth that face the first channel.

Example 7

The pawl-latching device as recited in example 1, wherein the at least one wall is shaped to define the cavity to size-match to an industry-standard flat-blade screwdriver.

Example 8

The pawl-latching device as recited in example 1, wherein the at least one wall is shaped to fit a contour of a tip of the release tool.

Example 9

The pawl-latching device as recited in example 1, wherein the one or more additional pawl teeth are arranged in two substantially parallel columns separated by the cavity.

Example 10

The pawl-latching device as recited in example 1, wherein the integrated release feature is positioned internally to the locking head such that the integrated release feature does not extend outside of the locking head.

Example 11

The pawl-latching device as recited in example 1, wherein a surface of the integrated release feature is substantially flush with an outer surface of the locking head.

Example 12

A pawl-latching device comprising: an elongate strap having a head end, a tail end that is opposite the head end, and a plurality of serrations disposed on one side of the elongate strap; a locking head integrally connected to the head end of the elongate strap, the locking head defining a slot that extends through the locking head and includes first and second conjoined channels, the first channel configured for receiving the strap with the plurality of serrations; a pawl disposed within the second channel via a hinged connection to the locking head and positioned below a top surface of the locking head, the pawl including a plurality of pawl teeth disposed on a face of the pawl that faces the first channel, the plurality of pawl teeth configured to engage one or more serrations of the plurality of serrations when the tail end of the elongate strap is disposed within the first channel; and an integrated release feature integrally connected to the pawl, the integrated release feature comprising a multi-walled structure defining multiple sides of the cavity and having ends facing the first channel, the multi-walled structure defining a cavity in a midsection of the pawl that is configured to receive a release tool, the ends of the multi-walled structure having one or more additional pawl teeth.

Example 13

The pawl-latching device as recited in example 12, wherein the pawl includes an indentation in a planar surface of the pawl that defines a bottom of the cavity, the indentation configured to receive a tip of the release tool to prevent lateral movement of the tip of the release tool toward or away from the first channel.

Example 14

The pawl-latching device as recited in example 12, wherein the multi-walled structure is formed to define the cavity to fit a contour and size of a tip of the release tool.

Example 15

The pawl-latching device as recited in example 14, wherein the release tool comprises a flat-blade tip.

Example 16

The pawl-latching device as recited in example 14, wherein the multi-walled structure has a height within a range of approximately 1.0 mm to approximately 3.0 mm.

Example 17

The pawl-latching device as recited in example 12, wherein the multi-walled structure includes a back wall integrally connected to two side walls to form a U-shaped structure around the cavity.

Example 18

The pawl-latching device as recited in example 17, wherein the side walls are separated by a distance that is within a range of approximately 0.8 mm to approximately 6.5 mm.

Example 19

The pawl-latching device as recited in example 17, wherein the back wall is offset from the face of the pawl by a distance that is within a range of approximately 0.5 mm to approximately 2 mm.

Example 20

The pawl-latching device as recited in example 12, wherein the multi-walled structure includes a back wall and two side walls that together define the cavity, the back wall being disjointed from the two side walls, the two side walls configured to guide a tip of the release tool, the two side walls having one or more rows of pawl teeth facing the first channel and configured to engage one or more serrations of the plurality of serrations of the elongate strap when the elongate strap is disposed within the first channel.

CONCLUSION

Although aspects of an integrated release feature for pawl-latching devices have been described in language specific to features and/or methods, the subject of the appended claims is not necessarily limited to the specific features or methods described. Rather, the specific features and methods are disclosed as example implementations of the integrated release feature for pawl-latching devices, and other equivalent features and methods are intended to be within the scope of the appended claims. Further, various different aspects are described, and it is to be appreciated that each described aspect can be implemented independently or in connection with one or more other described aspects.

What is claimed:
1. A pawl-latching device comprising:
an integrated release feature integrally connected to a pawl that is connected to a locking head of the pawl-latching device, the locking head defining a slot that extends through the locking head and includes a first channel conjoined with a second channel, the first channel configured to receive an elongate strap having a plurality of serrations, the pawl disposed within the second channel of the slot and positioned internally to the locking head, the pawl having multiple pawl teeth configured to engage the plurality of serrations on the elongate strap when the elongate strap is disposed within the first channel, the integrated release feature comprising:
at least one wall shaped to define multiple sides of an open cavity in a midsection of the pawl for receiving a release tool, the at least one wall having opposing ends that both face the first channel; and
one or more additional pawl teeth disposed on the opposing ends of the at least one wall that face the first channel.

2. The pawl-latching device as recited in claim 1, wherein the pawl includes a planar surface defining a bottom of the cavity, the planar surface having an indentation configured to receive a tip of the release tool to prevent slidable movement of the tip of the release tool toward the first channel across the planar surface of the pawl.

3. The pawl-latching device as recited in claim 1, wherein:
the at least one wall includes a back wall merged with two side walls to form a U-shaped structure around the cavity; and
the one or more pawl teeth are disposed on an end of each side wall that faces the first channel.

4. The pawl-latching device as recited in claim 3, wherein the back wall is configured to reinforce the side walls to provide increased wedging strength for the one or more additional pawl teeth.

5. The pawl-latching device as recited in claim 3, wherein integration of the side walls with the back wall provides reinforcement strength to the back wall for releasing the one or more pawl teeth when the one or more pawl teeth are compressively engaged with one or more serrations of the plurality of serrations on the elongate strap and a force is applied to the back wall in a direction away from the elongate strap.

6. The pawl-latching device as recited in claim 1, wherein the cavity is formed by a bifurcation in a portion of the pawl including a portion of the one or more pawl teeth that face the first channel.

7. The pawl-latching device as recited in claim 1, wherein the at least one wall is shaped to define the cavity to size-match to an industry-standard flat-blade screwdriver.

8. The pawl-latching device as recited in claim 1, wherein the at least one wall is shaped to fit a contour of a tip of the release tool.

9. The pawl-latching device as recited in claim 1, wherein the one or more additional pawl teeth are arranged in two substantially parallel columns separated by the cavity.

10. The pawl-latching device as recited in claim 1, wherein the integrated release feature is positioned internally to the locking head such that the integrated release feature does not extend outside of the locking head.

11. The pawl-latching device as recited in claim 1, wherein a surface of the integrated release feature is substantially flush with an outer surface of the locking head.

12. A pawl-latching device comprising:
an elongate strap having a head end, a tail end that is opposite the head end, and a plurality of serrations disposed on one side of the elongate strap;
a locking head integrally connected to the head end of the elongate strap, the locking head defining a slot that extends through the locking head and includes first and second conjoined channels, the first channel configured for receiving the strap with the plurality of serrations;
a pawl disposed within the second channel via a hinged connection to the locking head and positioned below a top surface of the locking head, the pawl including a plurality of pawl teeth disposed on a face of the pawl that faces the first channel, the plurality of pawl teeth configured to engage one or more serrations of the plurality of serrations when the tail end of the elongate strap is disposed within the first channel; and
an integrated release feature integrally connected to the pawl, the integrated release feature comprising a multi-walled structure defining multiple sides of the cavity and having ends facing the first channel, the multi-walled structure defining a cavity in a midsection of the pawl that is configured to receive a release tool, the ends of the multi-walled structure having one or more additional pawl teeth.

13. The pawl-latching device as recited in claim 12, wherein the pawl includes an indentation in a planar surface of the pawl that defines a bottom of the cavity, the indentation configured to receive a tip of the release tool to prevent lateral movement of the tip of the release tool toward or away from the first channel.

14. The pawl-latching device as recited in claim 12, wherein the multi-walled structure is formed to define the cavity to fit a contour and size of a tip of the release tool.

15. The pawl-latching device as recited in claim 14, wherein the release tool comprises a flat-blade tip.

16. The pawl-latching device as recited in claim 14, wherein the multi-walled structure has a height within a range of approximately 1.0 mm to approximately 3.0 mm.

17. The pawl-latching device as recited in claim 12, wherein the multi-walled structure includes a back wall integrally connected to two side walls to form a U-shaped structure around the cavity.

18. The pawl-latching device as recited in claim 17, wherein the side walls are separated by a distance that is within a range of approximately 0.8 mm to approximately 10 mm.

19. The pawl-latching device as recited in claim 17, wherein the back wall is offset from the face of the pawl by a distance that is within a range of approximately 0.5 mm to approximately 2 mm.

20. The pawl-latching device as recited in claim 12, wherein the multi-walled structure includes a back wall and two side walls that together define the cavity, the back wall being disjointed from the two side walls, the two side walls configured to guide a tip of the release tool, the two side walls having one or more rows of pawl teeth facing the first channel and configured to engage one or more serrations of the plurality of serrations of the elongate strap when the elongate strap is disposed within the first channel.

* * * * *